United States Patent
Kis et al.

(10) Patent No.: US 9,363,004 B2
(45) Date of Patent: Jun. 7, 2016

(54) APPARATUS AND ASSOCIATED METHODS FOR SWITCHING BETWEEN ANTENNAS IN A MULTI-ANTENNA RECEIVER

(75) Inventors: Levente Robert Kis, Gödöllo (HU); Andreas Richter, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/363,300

(22) PCT Filed: Dec. 19, 2011

(86) PCT No.: PCT/IB2011/055792
§ 371 (c)(1),
(2), (4) Date: Jun. 5, 2014

(87) PCT Pub. No.: WO2013/093550
PCT Pub. Date: Jun. 27, 2013

(65) Prior Publication Data
US 2014/0321583 A1 Oct. 30, 2014

(51) Int. Cl.
*H04B 7/00* (2006.01)
*H04L 1/02* (2006.01)
(Continued)

(52) U.S. Cl.
CPC . *H04B 7/082* (2013.01); *G01S 3/04* (2013.01); *G01S 3/043* (2013.01); *G01S 3/16* (2013.01); *G01S 3/46* (2013.01); *G01S 5/0247* (2013.01); *H04B 7/0811* (2013.01); *H04B 7/2662* (2013.01)

(58) Field of Classification Search
CPC .......... H04B 3/32; H04B 3/23; H04B 7/0617; H04B 7/0628; H04B 7/0417; H04B 7/0491; H04B 7/0634; H04L 25/03343; H04L 25/497; H04L 25/03057
USPC .................. 375/224–228, 259–285, 316–377
See application file for complete search history.

(56) References Cited

U.S. PATENT DOCUMENTS

| 2,836,816 A | 5/1958 | J.L. Allison et al. |
| 3,746,846 A | 7/1973 | Weihe |

(Continued)

FOREIGN PATENT DOCUMENTS

| EP | 0937368 A1 | 8/1999 |
| EP | 1148684 | 10/2001 |

(Continued)

OTHER PUBLICATIONS

International Search Report and Written Opinion received for corresponding Patent Cooperation Treaty Application No. PCT/IB2011/055792, dated Nov. 28, 2012, 16 pages.

(Continued)

*Primary Examiner* — James M Perez
(74) *Attorney, Agent, or Firm* — Locke Lord LLP

(57) ABSTRACT

Described herein are one or more apparatus, that at least partially synchronize with a first radio-frequency signal from a first antenna element, of an array of spatially distributed antenna elements in a multi-antenna array receiver, to determine the position of at least one of a repeated guard interval in the first radio-frequency signal from the first antenna element, the repeat occurring at a particular defined characteristic interval. The apparatus then use the determined position of the at least one guard interval in the first radio-frequency signal to switch to a second radio-frequency signal from a second antenna element, of the array of spatially distributed antenna elements in a multi-antenna receiver, and further determine a relative orientation of the multi-antenna receiver from a transmitter of the radio-frequency signals using characteristics determined for the first and second radio-frequency signals following the at least respective partial synchronizations.

20 Claims, 7 Drawing Sheets

(51) Int. Cl.
  H04B 7/08    (2006.01)
  G01S 3/46    (2006.01)
  G01S 5/02    (2010.01)
  H04B 7/26    (2006.01)
  G01S 3/04    (2006.01)
  G01S 3/16    (2006.01)

(56) References Cited

U.S. PATENT DOCUMENTS

| | | | |
|---|---|---|---|
| 3,838,427 | A | 9/1974 | King, Jr. et al. |
| 3,958,244 | A | 5/1976 | Lee et al. |
| 5,740,048 | A | 4/1998 | Abel et al. |
| 6,064,340 | A | 5/2000 | Croft et al. |
| 6,195,046 | B1 | 2/2001 | Gilhousen |
| 6,321,092 | B1 | 11/2001 | Fitch et al. |
| 6,437,739 | B1 | 8/2002 | Schulte et al. |
| 6,842,444 | B2 | 1/2005 | Bolgiano et al. |
| 7,116,988 | B2 | 10/2006 | Dietrich et al. |
| 7,495,614 | B2 | 2/2009 | Small |
| 8,179,318 | B1 | 5/2012 | Furman et al. |
| 8,498,577 | B2* | 7/2013 | Achkar et al. ............... 455/63.4 |
| 2001/0047229 | A1 | 11/2001 | Staggs |
| 2002/0122003 | A1 | 9/2002 | Patwari et al. |
| 2002/0167417 | A1 | 11/2002 | Welles, II et al. |
| 2003/0002471 | A1 | 1/2003 | Crawford et al. |
| 2003/0197645 | A1 | 10/2003 | Ninomiya et al. |
| 2004/0162084 | A1 | 8/2004 | Wang |
| 2005/0135292 | A1 | 6/2005 | Graumann |
| 2005/0254608 | A1 | 11/2005 | Lee et al. |
| 2006/0087475 | A1 | 4/2006 | Struckman |
| 2006/0148488 | A1 | 7/2006 | Syrbe |
| 2006/0205417 | A1 | 9/2006 | Ju et al. |
| 2006/0217132 | A1 | 9/2006 | Drummond-Murray et al. |
| 2006/0290499 | A1 | 12/2006 | Chang |
| 2007/0247367 | A1 | 10/2007 | Anjum et al. |
| 2007/0281621 | A1* | 12/2007 | Achkar et al. ............... 455/63.4 |
| 2008/0191941 | A1 | 8/2008 | Saban et al. |
| 2009/0060076 | A1 | 3/2009 | Ma et al. |
| 2009/0082019 | A1 | 3/2009 | Marsico |
| 2010/0183099 | A1* | 7/2010 | Toda et al. .................... 375/340 |
| 2010/0195754 | A1* | 8/2010 | Li et al. ........................ 375/267 |
| 2010/0302102 | A1 | 12/2010 | Desai et al. |

FOREIGN PATENT DOCUMENTS

| | | |
|---|---|---|
| EP | 1329737 A2 | 7/2003 |
| EP | 1731919 A1 | 12/2006 |
| EP | 1786143 A2 | 5/2007 |
| EP | 2110965 | 10/2009 |
| JP | 2007139521 | 6/2007 |
| JP | 2011-089947 A | 5/2011 |
| WO | 98/19488 A1 | 5/1998 |
| WO | 03/073647 A1 | 9/2003 |
| WO | 2004/059251 A1 | 7/2004 |
| WO | 2005/002070 A2 | 1/2005 |
| WO | 2007/026137 A1 | 3/2007 |
| WO | 2007/145890 A2 | 12/2007 |
| WO | 2009/022192 A1 | 2/2009 |
| WO | 2009/056150 A1 | 5/2009 |
| WO | 2011/131745 A2 | 10/2011 |
| WO | 2012008110 | 1/2012 |
| WO | 2012/042315 A1 | 4/2012 |

OTHER PUBLICATIONS

"EB Propsound CS—Radio Channel Measurement and Research", EB Propsound CS, Retrieved on Aug. 16, 2007, Webpage available at : http://www.elektrobit.com/index.php.
Battiti et al., "Optimal Wireless Access Point Placement for Location-Dependent Services", Technical report DIT-03-052, Oct. 2003, pp. 1-12.
Kalliola, "Experimental Analysis of Multi-Dimensional Radio Channels," Dissertation, Report S 251, Feb. 15, 2002, 54 pages.

International Search Report and Written Opinion received for corresponding Patent Cooperation Treaty Application No. PCT/EP2007/009360, dated Aug. 14, 2008, 17 pages.
Office action received for corresponding European Patent Application No. 07819402.4, dated Nov. 18, 2010, 6 pages.
Tang et al., "Synchronization Schemes for Packet OFDM System", IEEE International Conference on Communications, vol. 5, May 11-15, 2003, 5 pages.
Office action received for corresponding European Patent Application No. 07819402.4, dated Dec. 20, 2011, 4 pages.
Office action received for corresponding Chinese Patent Application No. 200780101323.8, dated Feb. 3, 2012, 4 pages of office action and 7 pages of office action translation.
Non-Final Office action received for corresponding U.S. Appl. No. 12/740,634, dated Jun. 21, 2012, 14 pages.
Krim et al., "Two Decades of Array Signal Processing Research: The Parametric Approach", IEEE Signal Processing Magazine, Volume:13, Issue: 4, Jul. 1996, pp. 67-94.
The Ultimate Technology in Radio Propagation Measurement, Proposound CS, Elektrobit, 6 pages.
Final Office action received for corresponding U.S. Appl. No. 12/740,634, dated Nov. 29, 2012, 13 pages.
Extended European Search Report received for corresponding European Patent Application No. 12192669.5, dated Dec. 18, 2012, 9 pages.
Office action received for corresponding Chinese Patent Application No. 200780101323.8, dated Jan. 7, 2013, 8 pages of office action and 2 pages of office action translation.
Non-Final Office action received for corresponding U.S. Appl. No. 12/740,634, dated Mar. 15, 2013, 14 pages.
Abdat et al., "Survey on Indoor Wireless Positioning Techniques: Towards Adaptive Systems", International Conference on Distributed Framework and Applications (DFmA), Aug. 2-3, 2010, pp. 1-5.
Ferreres et al., "Guaranteeing the Authenticity of Location Information", IEEE Pervasive Computing, vol. 7, Issue: 3, Jul.-Sep., 2008, pp. 72-80.
Kemppi et al., "Hybrid Positioning System Combining Angle-Based Localization, Pedestrian Dead Reckoning and Map Filtering", International Conference on Indoor Positioning and Indoor Navigation (IPIN), Sep. 15-17, 2010, pp. 1-7.
Papapostolou et al., "Exploiting Multi-modality and Diversity for Localization Enhancement: WiFi & RFID Use case", IEEE 20th International Symposium on Personal, Indoor and Mobile Radio Communications, Sep. 13-16, 2009, pp. 1903-1907.
Singelee et al., "Location Verification Using Secure Distance Bounding Protocols", IEEE International Conference on Mobile Adhoc and Sensor Systems Conference, Nov. 7, 2005, 7 pages.
Vora et al., "Secure Location Verification Using Radio Broadcast", IEEE Transactions on Dependable and Secure Computing, Volume:3, Issue: 4, Nov. 13, 2006, 15 pages.
Office action received for corresponding Chinese Patent Application No. 200780101323.8, dated Jun. 3, 2013, 6 pages of office action and 2 pages of office action translation.
Zagami et al., "Providing Universal Location Services Using a Wireless E911 Location network", IEEE Communications Magazine, vol. 36, Issue: 4, Apr. 1998, pp. 66-71.
Bahl et al., "RADAR: An In-Building RF-Based User Location and Tracking System", Proceedings of the Nineteenth Annual Joint Conference of the IEEE Computer and Communications Societies, Volume:2, 2000, 10 pages.
Najar et al., "Kalman Tracking Based on TDOA for UMTS Mobile Location", 12th IEEE International Symposium on Personal, Indoor and Mobile Radio Communications, vol. 1, Sep. 2001, 5 pages.
Ghosh et al., "A Hybrid Distance-Measurement/Angle-of-Arrival Approach to Localization", Australasian Telecommunication Networks and Applications Conference, Dec. 7-10, 2008, pp. 230-234.
Non-Final Office action received for corresponding U.S. Appl. No. 12/740,634, dated Aug. 14, 2013, 21 pages.
Office action received for corresponding European Patent Application No. 12192669.5, dated Sep. 19, 2013, 6 pages.
Office action received for corresponding European Patent Application No. 07819402.4, dated Sep. 25, 2013, 7 pages.

(56) References Cited

OTHER PUBLICATIONS

Office action received for corresponding Chinese Patent Application No. 200780101323.8, dated Dec. 23, 2013, 6 pages of office action and 4 pages of office action translation.
Final Office action received for corresponding U.S. Appl. No. 12/740,634, dated Apr. 2, 2014, 18 pages.
International Search Report and Written Opinion received for corresponding Patent Cooperation Treaty Application No. PCT/IB2011/052780, dated Sep. 28, 2012, 7 pages.
International Search Report and Written Opinion received for corresponding Patent Cooperation Treaty Application No. PCT/IB2011/055556, dated Sep. 21, 2012, 12 pages.
International Search Report and Written Opinion received for corresponding Patent Cooperation Treaty Application No. PCT/IB2012/053340, dated Nov. 21, 2012, 14 pages.
Extended European Search Report for EP Application No. 11877658.2—Date of Completion of Search: Aug. 19, 2015, 7 pages.

\* cited by examiner

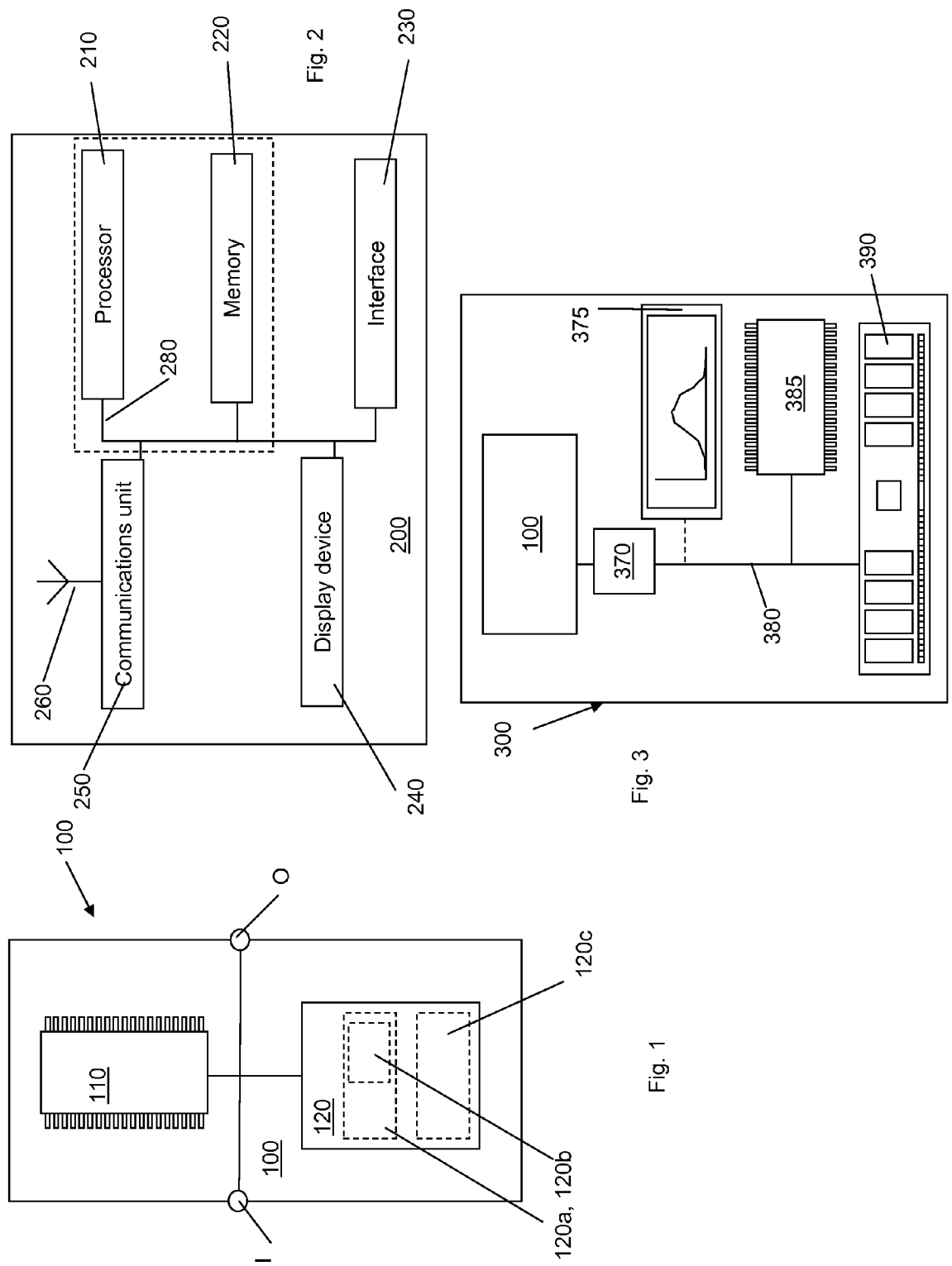

APPARATUS AND ASSOCIATED METHODS FOR SWITCHING BETWEEN ANTENNAS IN A MULTI-ANTENNA RECEIVER

RELATED APPLICATION

This application was originally filed as PCT Application No. PCT/IB2011/055792 filed Dec. 19, 2011.

TECHNICAL FIELD

The present disclosure relates to the field of radio-frequency (RF) signalling direction finding, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs) and tablet PCs.

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

In the field of mobile communications and localization/positioning, positioning and direction finding applications use antenna arrays, (which are also called multi-antennas). It is advantageous to use a large number of antenna elements because the use of such antenna arrays improves positioning accuracy, especially in indoor scenarios. Conventional antenna array receivers have to contain as many receiver chains as there are antenna elements in the array, leading to at least high hardware complexity which grows linearly with the number of antenna elements in the array. To reduce hardware complexity in receivers using antenna arrays, a circuit using a fast radio-frequency switch and a single receiver chain can be used.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising:
at least one processor; and
at least one memory including computer program code, the at least one memory and the computer program configured to, with the at least one processor, cause the apparatus to perform at least the following:
perform at least partial synchronisation on a first radio-frequency signal from a first antenna element, of an array of spatially distributed antenna elements in a multi-antenna array receiver, to determine the position of at least one of a repeated guard interval in the first radio-frequency signal from the first antenna element, the repeat occurring at a particular defined characteristic interval;
use the determined position of the at least one guard interval in the first radio-frequency signal to switch to a second radio-frequency signal from a second antenna element, of the array of spatially distributed antenna elements in a multi-antenna receiver, the switch being performed from the determined position of the at least one repeated guard interval, or a position of a repeated guard interval, in the first radio-frequency signal to perform at least partial synchronisation to the second radio-frequency signal; and
determine a relative orientation of the multi-antenna receiver from a transmitter of the RF signals using characteristics determined for the first and second radio-frequency signals following the at least respective partial synchronisations.

The apparatus may be configured to perform at least partial synchronisation on the second radio-frequency (RF) signal after the switch.

The apparatus may be configured to identify training symbols in the respective RF signals received from the respective antenna elements to perform said synchronisation.

Partial synchronisation may be considered to provide for one or more of a primary coarse synchronisation fix and a secondary fine synchronisation fix. Fine synchronisation can also be considered to provide for repeated synchronisation, i.e. tracking of an incoming signal.

The apparatus may be configured to identify training symbols in the first RF signal to perform said (at least partial) synchronisation.

The apparatus may be configured to identify training symbols in the second RF signal to perform said (at least partial) synchronisation.

The apparatus may be configured to perform determination of the relative orientation characteristics of the first and second radio-frequency signals after the respective at least partial synchronisations.

The repeated guard intervals may have a particular length, wherein the switching is performed to coincide with the beginning, middle or end of the particular length.

The RF signal may comprise a modulated carrier wave, modulated to represent data.

Radio-frequency (RF) signalling is the raw signalling transmitted over the air interface on the carrier i.e. before demodulation to remove the carrier and decoding to retrieve the data content of the signalling The first and second radio-frequency signals may represent repeated instances of the same data.

The first and second RF signals may represent one or more whole frames or partial frames, the frame comprising a sequence of training symbols and payload data demarcated with respective repeated guard intervals.

The frame may represent a packetized burst in at least one of an orthogonal frequency division multiplex (OFDM) or wireless local area network (WLAN) system.

The apparatus may be configured to use at least one common demodulation and decoding channel path in demodulating and decoding the respective first and second radio-frequency signals.

The apparatus may be configured to switch the radio-frequency signals from the respective antenna elements to use the at least one common demodulation and decoding channel path to demodulate and decode the respective radio-frequency signals, the switch being performed from the determined position of the at least one repeated guard interval, or a position of a repeated guard interval, in an radio-frequency signal from a previous antenna element.

The apparatus may be configured to use the at least one common demodulation and decoding channel path in demodulating and decoding the respective first and second radio-frequency signals and wherein the apparatus is configured to determine the relative orientation characteristics using the at least one common demodulation and decoding channel path.

The apparatus may be configured to use:
a first reference demodulation and decoding channel path connected to a first reference antenna element; and
a second receiver demodulation and decoding channel path connected to a second receiver antenna element,
wherein the first reference channel path is useable to synchronise switching of the second receiver demodulation and decoding channel path from the second receiver antenna element to a further receiver antenna element.

The first reference antenna element may be the same reference antenna element for all receiver elements to which the second receiver channel path is switched.

The first reference antenna element for a given receiver element may be switched so as to vary in accordance with the particular receiver antenna element currently in use.

The apparatus may be configured to determine the position of a repeated guard interval by using the particular predefined interval characteristic on the position of the at least one repeated guard interval.

The relative orientation characteristics determined for the first and second radio-frequency signals, following the at least partial synchronisations, may be comprise the respective phases and amplitudes of the first and second radio-frequency signals.

The apparatus may be configured to switch to radio-frequency signals from further antenna elements from the spatially distributed antenna elements of the multi-antenna array receiver, the switch being performed from the determined position of the at least one repeated guard interval, or a position of a repeated guard interval, in the first radio-frequency signal, or the radio-frequency signal from the previous antenna element, to perform at least partial synchronisation to the further radio-frequency signal; and
determine a relative orientation of the multi-antenna receiver from the transmitter using characteristics determined for a plurality of the first, second and further radio-frequency signals following the at least partial synchronisation.

The multi-antenna array receiver may be an OFDM receiver.

The apparatus may be configured for operating according to one or more of OFDM, WLAN, 802.11a/g/n standards, LTE, WiMax, and the like.

The apparatus may be one or more of: an electronic device, a portable electronic device, a laptop computer, a desktop computer, a mobile phone, a Smartphone, a tablet computer, a monitor, a personal digital assistant, a digital camera, a watch, a server, or a module/circuitry for one or more of the same.

In another aspect, there is provided a method comprising:
performing at least partial synchronisation on a first radio-frequency signal from a first antenna element, of an array of spatially distributed antenna elements in a multi-antenna array receiver, to determine the position of at least one of a repeated guard interval in the first radio-frequency signal from the first antenna element, the repeat occurring at a particular defined characteristic interval;
using the determined position of the at least one guard interval in the first radio-frequency signal to switch to a second radio-frequency signal from a second antenna element, of the array of spatially distributed antenna elements in a multi-antenna receiver, the switch being performed from the determined position of the at least one repeated guard interval, or a position of a repeated guard interval, in the first radio-frequency signal to perform at least partial synchronisation to the second radio-frequency signal; and
determining a relative orientation of the multi-antenna receiver from a transmitter of the RF signals using characteristics determined for the first and second radio-frequency signals following the at least respective partial synchronisations.

In another aspect described herein, there is provided an apparatus configured to perform the steps of the above method aspect using a sequencer.

In another aspect, there is provided a computer readable medium comprising computer program code stored thereon, the computer readable medium and computer program code being configured to, when run on at least one processor, perform at least the following:
performing at least partial synchronisation on a first radio-frequency signal from a first antenna element, of an array of spatially distributed antenna elements in a multi-antenna array receiver, to determine the position of at least one of a repeated guard interval in the first radio-frequency signal from the first antenna element, the repeat occurring at a particular defined characteristic interval;
using the determined position of the at least one guard interval in the first radio-frequency signal to switch to a second radio-frequency signal from a second antenna element, of the array of spatially distributed antenna elements in a multi-antenna receiver, the switch being performed from the determined position of the at least one repeated guard interval, or a position of a repeated guard interval, in the first radio-frequency signal to perform at least partial synchronisation to the second radio-frequency signal; and
determining a relative orientation of the multi-antenna receiver from a transmitter of the RF signals using characteristics determined for the first and second radio-frequency signals following the at least respective partial synchronisations.

In another aspect there is provided an apparatus comprising:
a means for synchronising configured to perform at least partial synchronisation on a first radio-frequency signal from a first antenna element, of an array of spatially distributed antenna elements in a multi-antenna array receiver, to determine the position of at least one of a repeated guard interval in the first radio-frequency signal from the first antenna element, the repeat occurring at a particular defined characteristic interval;
a means for switching configured to switch to a second radio-frequency signal from a second antenna element, of the array of spatially distributed antenna elements in a multi-antenna receiver, using the determined position of the at least one guard interval in the first radio-frequency signal to, the switch being performed from the determined position of the at least one repeated guard interval, or a position of a repeated guard interval, in the first radio-frequency signal to perform at least partial synchronisation to the second radio-frequency signal; and a means for determining configured to determine a relative orientation of the multi-antenna receiver from a transmitter of the RF signals using characteristics determined for the first and second radio-frequency signals following the at least respective partial synchronisations.

In another aspect described herein, there is provided a sequencer configured to be able to:

perform at least partial synchronisation on a first radio-frequency signal from a first antenna element, of an array of spatially distributed antenna elements in a multi-antenna array receiver, to determine the position of at least one of a repeated guard interval in the first radio-frequency signal from the first antenna element, the repeat occurring at a particular defined characteristic interval;

use the determined position of the at least one guard interval in the first radio-frequency signal to switch to a second radio-frequency signal from a second antenna element, of the array of spatially distributed antenna elements in a multi-antenna receiver, the switch being performed from the determined position of the at least one repeated guard interval, or a position of a repeated guard interval, in the first radio-frequency signal to perform at least partial synchronisation to the second radio-frequency signal; and determine a relative orientation of the multi-antenna receiver from a transmitter of the radio-frequency signals using characteristics determined for the first and second radio-frequency signals following the at least respective partial synchronisations.

The sequencer may be a field programmable gate array configured to be useable with or without one or more processors.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

FIG. 1 illustrates an example according to the present disclosure.

FIG. 2 illustrates another example.

FIG. 3 illustrates another example.

DESCRIPTION OF EXAMPLE ASPECTS/EMBODIMENTS

Figure 4:
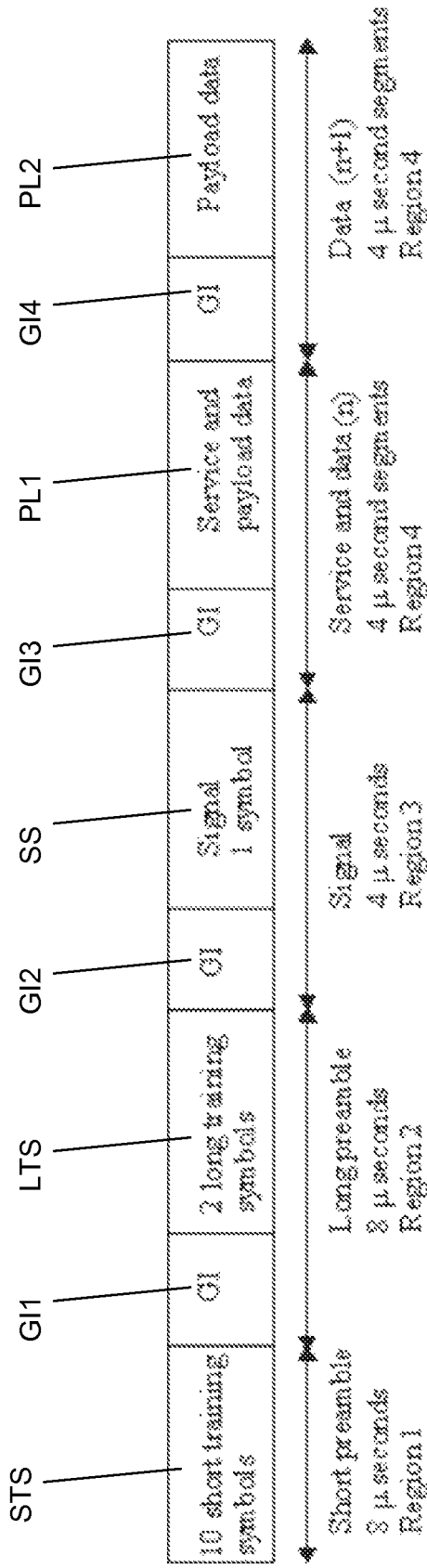
FIG. 4 illustrates a frame of information.

Angle of arrival (AoA) based indoor positioning systems require an antenna array at the receiver. In known multi-antenna receivers, converting the received signal into a digital baseband signal requires one demodulator/decoder path for each antenna element. Consequently, the hardware complexity of such a solution grows linearly with the number of antenna elements. This increases hardware size and weight as well as the cost of the receiver.

In contrast to telephony communication systems, it is not necessary to obtain the antenna signals simultaneously for AoA systems. The antenna signals can be obtained sequentially from different elements at different times. This principle is used in, e.g. channel sounding methods, or Bluetooth LE based indoor positioning systems, etc. Using the switching principle for unsynchronised, i.e. random access (CSMA) radio transmission requires real-time (RT) synchronisation of the antenna switching times with the received signal. Such systems do not continuously stream data, but transmit signals representing data in packetized bursts.

To use the switching antenna receiver for wireless local area network (WLAN) signals requires a higher accuracy in the switching times as needed for, say, Bluetooth signals for example. There is currently no solution for real-time antenna switching synchronization for random access broadband radio transmissions (e.g. WLAN IEEE802.11a, IEEE802.11g, IEEE802.11n). Described example embodiments will be described in relation to WLAN implementations, but it will be appreciated by those skilled in the art that this process could be applied to other OFDM systems.

In one or more embodiments described herein, there is provided an apparatus that, at least in some embodiments, comprises at least one processor and at least one memory with computer program code stored thereon, the code being configured to, with the processor, cause the apparatus to perform particular steps to provide improvements in the abovementioned fields.

Firstly, the apparatus performs at least partial synchronisation on a first radio-frequency (RF) signal from a first antenna element, of an array of spatially distributed antenna elements in a multi-antenna array receiver, to determine the position of at least one of a repeated guard interval in the first radio-frequency (RF) signal from the first antenna element, the repeat occurring at a particular defined characteristic interval. Thus, the apparatus synchronises with signalling received via a first antenna element based on the repeated occurrence of so-called guard intervals in the signal.

These guard intervals are not provided to carry payload data (i.e. payload data being critical data of interest to a user) but to help provide for redundancy within data packets. These guard intervals occur regularly at predefined characteristic intervals, according to the OFDM standard/protocol used in a given multi-antenna system.

Secondly, the apparatus uses the determined position of the at least one guard interval in the first radio-frequency signal to switch to a second radio-frequency signal from a second antenna element, of the array of spatially distributed antenna elements in a multi-antenna receiver, the switch being performed from the determined position of the at least one repeated guard interval, or a position of a repeated guard interval, in the first radio-frequency signal to perform at least partial synchronisation to the second radio-frequency signal. Because the guard intervals provide redundancy, it is advantageous to switch (where switching is to be used for receiving signals from different antenna elements as in the present disclosure) to another antenna element during reception of a guard interval instead of switching at some arbitrary time, which could result in switching during reception of critical data and therefore incurring data loss.

Thirdly, the apparatus determines a relative orientation of the multi-antenna receiver from a transmitter of the RF signals using characteristics determined for the first and second radio-frequency signals following the at least respective partial synchronisations. By receiving signals from different antenna elements that are spatially distributed, the slight variations in phase and amplitude of the signals received by each antenna can be compared to establish the direction or relative orientation of the signal source.

We will now describe a first example with reference to FIG. 1, which shows an apparatus 100 comprising a processor 110, memory 120, input I and output O. In this embodiment only one processor and one memory are shown but it will be appreciated that other embodiments may utilise more than one processor and/or more than one memory (e.g. same or different processor/memory types). For example, the memory 120 can be composed of at least one block of ROM 120a and at least one block of RAM 120c. The ROM block 120a allows for storage of data/computer program code (as software code represent by software code block 120b) and the RAM block 120c also provides operating space (using RAM block 120c) for the connected processor 110 to utilise that software code from block 120b. This particular configuration is illustrated with the dashed blocks of FIG. 1. Such an arrangement where a processor utilises memory blocks 120a/b/c in such a way to perform operations specified by a computer program would be understood by a person skilled in the art.

In this embodiment the apparatus 100 is an application specific integrated circuit (ASIC) for a portable electronic device 200 with a touch sensitive display 240 (as per FIG. 2 and later shown in FIGS. 11 and 12). In other embodiments the apparatus 100 can be a module for such a device, or may be the device itself, wherein the processor 110 is a general purpose CPU of the device 200 and the memory 120 is general purpose memory comprised by the device 200. It will be appreciated that the schematic illustration of apparatus 100 of FIG. 1 can be implemented as different types and configurations of apparatus, e.g. module, ASIC, some variations of FPGA, etc, and that this figure should not be understood to limit the possible implementations of the apparatus of the present disclosure. For example, it is possible to implement one or more embodiments as FPGA arrangements where one or more processors are used, or even to provide arrangements that do not utilise any processors at all (e.g. using a sequencer).

The input I allows for receipt of signalling to the apparatus 100 from further components, such as a multi-antenna receiver array like that of the multi-antenna array 260 in portable electronic device 200 of FIG. 2, or also from other components of portable electronic device 200 (like the touch-sensitive display 240 in FIG. 2) or the like. The output O allows for onward provision of signalling from within the apparatus 100 to further components (e.g. back to multi-antenna array 260 for switching of the array 260, or to the display 240 the like). In this embodiment the input I and output O are part of a connection bus that allows for connection of the apparatus 100 to further components.

The processor 110 is a general purpose processor dedicated to executing/processing information received via the input I in accordance with instructions stored in the form of computer program code on the memory 120. The output signalling generated by such operations from the processor 110 is provided onwards to further components via the output O.

The memory 120 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 110, when the program code is run on the processor 110. The internal connections between the memory 120 and the processor 110 can be understood to, in one or more embodiments, provide an active coupling between the processor 110 and the memory 120 to allow the processor 110 to access the computer program code stored on the memory 120.

In this embodiment the input I, output O, processor 110 and memory 120 are all electrically connected to one another internally to allow for electrical communication between the respective components I, O, 110, 120. In this example the components are all located proximate to one another so as to be formed together as an ASIC, in other words, so as to be integrated together as a single chip/circuit that can be installed into an electronic device. In other embodiments one or more or all of the components may be located separately from one another (for example, throughout a portable electronic device like device 200 of FIG. 2 or device 300 of FIG. 3 and/or may provide/support other functionality, i.e. shared to provide different respective functionalities).

Apparatus 100 discussed above can be used as a component for another apparatus or device such as in FIG. 2 (or, in a more specific example, like a PDA as per FIG. 12—discussed later). FIG. 2 can be understood to depict a variation of apparatus 100 or a device 200 that incorporates the functionality of apparatus 100 spread throughout constituent components. FIG. 3 can be understood to depict a variation of apparatus 100 or a device 200 that actually incorporates apparatus 100 to provide its functionality. The integration and operation of apparatus 100 within devices 200, 300 will become evident from the following. Although in a number of embodiments the apparatus 100 is shown as configured as a processor and a memory, as stated above, in some embodiments a sequencer can be used (e.g. a field programmable gate array) that does not necessarily utilise a processor for its operation. The implementation of the following functionality as a sequencer or FPGA will be appreciated by someone skilled in the art.

We will now describe the functionality provided by apparatus 100 with reference to FIG. 4 which shows an OFDM frame according to the OFDM standard for 802.11a/b/g/n wireless communications. This frame is composed of several components which are as follows:

(i) 10 short training symbols (STS)—the short training symbols are, according to the standard, the features of the OFDM signalling that OFDM receivers look for to establish a coarse synchronisation fix on the received OFDM signalling (discussed in more detail below). While these symbols provide for coarse synchronisation, this can be considered to provide for at least partial synchronisation with a given signal from a given antenna element. Other components of the frame can provide for enhanced synchronisation, but in any case at least partial synchronisation is provided for by these short training symbols STS;

(ii) first guard interval (GI1)—as already stated, guard intervals do not carry payload data but are repeated lengths of code that separate respective OFDM blocks of data within a given frame. In the illustrated frame, each respective OFDM block is preceded by a guard interval that is actually a copy of the last 800 ns of that particular OFDM block. In this case, GI1 precedes 2 long training symbols (LTS—which are discussed in more detail below), which means that the last 800 ns worth of data of the 2 long training symbols is copied and used as the preceding guard interval for those symbols. This is done as part of a given OFDM standard at the receiver;

(iii) 2 long training symbols (LTS)—the long training symbols LTS are, according to any given OFDM standard, the features of the OFDM signalling that OFDM receivers use to establish a fine synchronisation fix on the received OFDM signalling, i.e. to further refine the coarse synchronisation fix achieved using the short training symbols STS. This refinement of the synchronisation can be understood to improve synchronisation with a given signal, as the coarse synchronisation fix provided by the short training symbols STS is not quite as accurate as that which is achievable using the long training symbols LTS;

(iv) second guard interval (GI2)—another guard interval that separates the 2 long training symbols LTS and the next OFDM block;

(v) signal 1 symbol (SS)—This is a standard part of OFDM frames and is well understood in the art. This is part of standard OFDM protocols that control how the frame is used and interpreted.

(vi) third guard interval (GI3)—another guard interval that separates the payload and service data (PL1—see below) and the earlier signal symbol SS;

(vii) payload and service data (PL1)—this is the first instance of actual data that is to be received and used in some way, e.g. data relating to an Internet webpage being wirelessly streamed in packetized bursts to a wireless communications device. The training symbols can be considered to be a header to the real data of interest that is being carried as payload data (PL1-PLn);

(viii) fourth guard interval (GI4)—another guard interval; and (ix) payload data (PL2)—second instance of actual data. The frame may continue for a longer or shorter period of time, with more or less payload data or other OFDM blocks contained therein. This is just an example.

Figure 5:
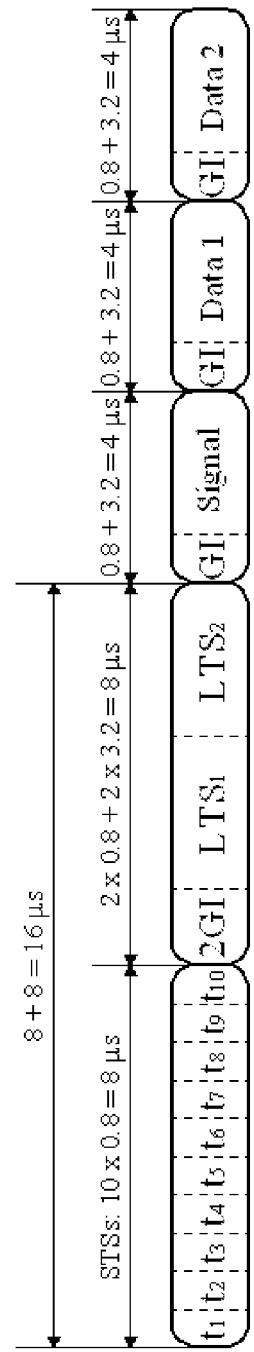
FIG. 5 illustrate timing associated with a frame of information.

FIG. 5 illustrates the timing attributes of the different OFDM blocks within the frame. The OFDM standard in this example provides a standard definition that the short training symbols STS must be 10 symbols long, each symbol being 0.8 microseconds long. Further standard-defined definitions apply to the long training symbols LTS, the guard intervals GI1-4, the payload data PL1-2, etc. Other standards have other standard-defined definitions for their signal syntax.

If the direction from which the radio-frequency (RF) signalling originated is not important, the apparatus 100 can just receive and demodulate the data of the signalling via a single antenna element. In contrast, if the direction must be established, then a multi-antenna receiver is required to obtain information about the angle of arrival of signalling. Each element will receive a slightly different version of the transmitted OFDM signalling, and the subtle variations between the signals received at each element (e.g. phase, amplitude differences etc) reflect the angle of arrival of the OFDM signalling.

In the art, this reception of data and performance of direction finding would be done by providing demodulation/decoder chains for each and every antenna element. This ensures that the data contained in the OFDM signalling is received, demodulated and decoded for each and every antenna element and reduces likelihood of data loss. To save costs, a single common demodulation/decoder path can be used, but the switching must be done carefully to avoid switching during critical data reception.

Figure 6:
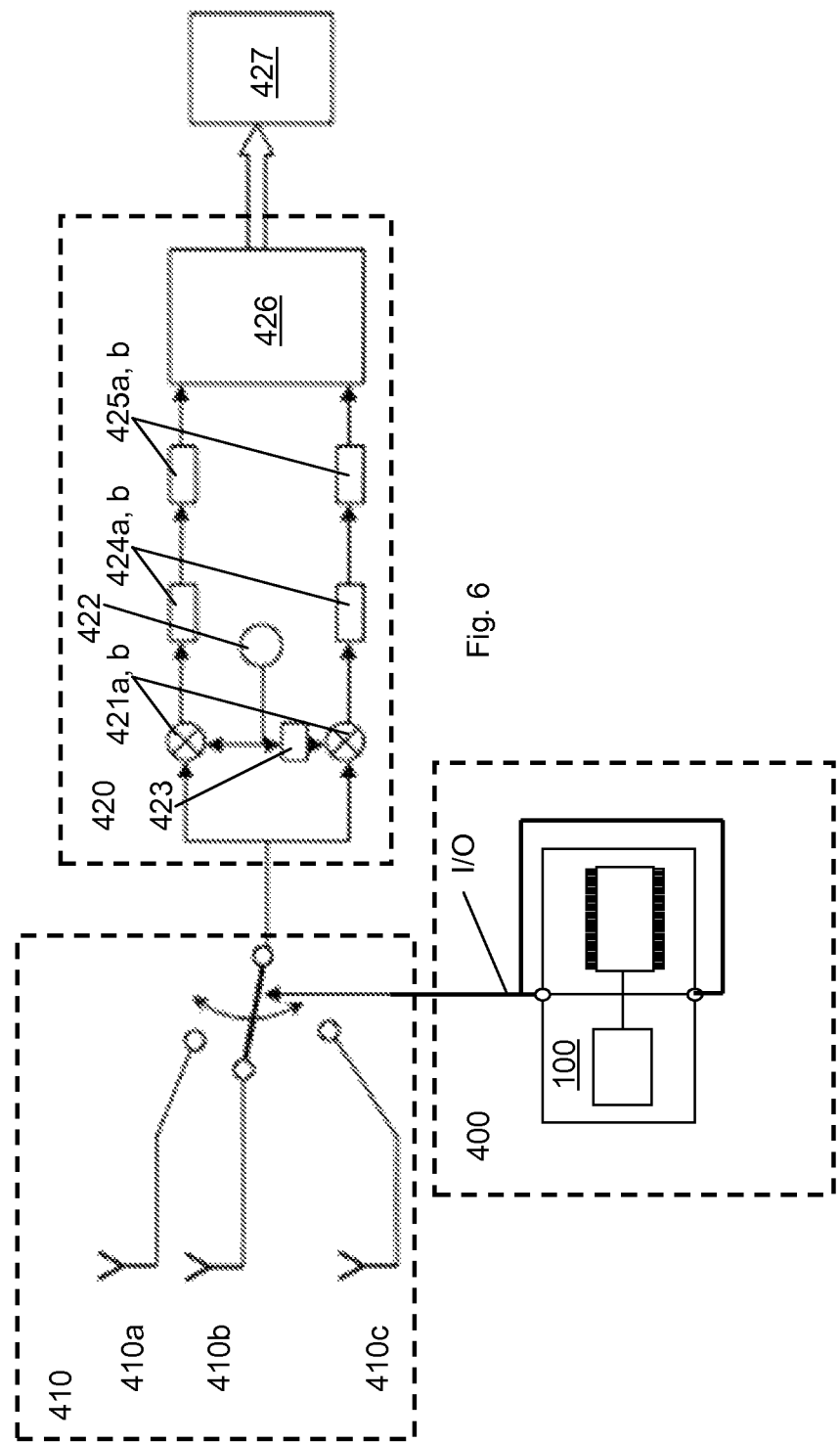
FIG. 6 illustrates a first example utilising a common demodulator/decoder path.

FIG. 6 illustrates an example embodiment. The input and output I/O of the apparatus 100 is connected to a multi-antenna array 410 comprising a plurality of antenna elements 410a-c (such arrays are well-known in the art). The apparatus 100 is also connected to a single demodulation/decoder chain 420 for reading the OFDM data in the signalling (such demodulation/decoder chains are also well-known in the art). Such chains typically have two mixers (421a, b)—as well as a local oscillator (422) and phase shifter (423)—two low-pass filters (424a, b), two AD converters (425a, b) and one decoder (426) to provide an output to a determine of orientation component (427) though other designs for such chains which provide equivalent functionality/functionalities are within the scope of the present disclosure.

The apparatus 100 in this example forms a synchronisation circuit 400 for switching which antenna element of the array 410 is currently being used for receiving OFDM signalling.

OFDM signalling is transmitted from a source at some distance and some unknown orientation from the example receiver of FIG. 6. A signal is received via a first antenna element 410a of the multi-antenna that represents the transmitted OFDM signalling. The short training symbols STS are always the same from frame to frame and for a given standard. Therefore, the synchronisation circuit 400 needs to monitor signals received via a first antenna element 410a to lock onto those signals and perform a coarse (i.e. at least partial) synchronisation on that signal. The sequence of the short training symbols STS provides a training preamble that is therefore used to detect the beginning of a OFDM frame, which in this case is a WLAN OFDM frame.

An autocorrelation function is used to determine the frame start i.e. the occurrence of the known short training symbols STS. Autocorrelation is the cross-correlation of a signal with itself. Informally, it is the similarity between observations as a function of the time separation between them. It is a mathematical tool for finding repeating patterns, such as the presence of a periodic signal (like repeating training symbols) which could have been buried under noise, or identifying the missing fundamental frequency in a signal implied by its harmonic frequencies. For example, because the short and long training symbols are defined within a given standard it is possible to perform pattern matching to identify those training symbols from the raw IQ signal data, and/or the demodulated/decoded signal. The principle behind autocorrelation of signals is well understood in the art and various different approaches can be used to perform equivalent functionality in this aspect.

An autocorrelation function can be also applied to find the exact time when a new symbol of a given OFDM block within the frame is started by pattern matching the signal with itself, for example, to spot rising or falling edges that can indicate the beginning, middle, or end of particular symbols within the frame.

From this autocorrelation/pattern matching information, the synchronisation circuit 400 establishes the start time for the frame based on the short training symbols STS, and can then know exactly where the long training symbols are to be expected to allow for a fine synchronisation fix with the signal. This fine/complete synchronisation need not always be performed as in some instances a coarse/partial synchronisation can be sufficient (e.g. with greater data redundancy, greater knowledge of the system, etc giving a greater margin for error).

In any case, once the synchronisation circuit 400 is synchronised to some extent (whether partial or fully) with the signal from the first antenna element 410a, expected start times for each of the OFDM blocks within the frame, inclusive of their respective preceding guard intervals, are therefore known from the given standard being used as the syntax of each frame is predetermined according to each OFDM standard.

The first antenna element is therefore used for timing acquisition using the short training sequence (STS) in the beginning of the OFDM WLAN frame. As the length of an OFDM block is known to be 4000 ns (see FIG. 4), the beginning, middle, and/or end of any given OFDM block can be inferred with some accuracy from this starting time estimate.

The synchronisation circuit 400 then uses the determined position of the at least one guard interval GI1-4 in the first radio-frequency signal (received via the first antenna element 410a) to switch to receiving a second radio-frequency signal from a second antenna element 410b of the multi-antenna array during a guard interval. Because the guard intervals occur at particular defined characteristic intervals based on the OFDM standard, the synchronisation circuit 400 therefore knows the expected position of each guard interval GI1-4 within the received signal from the first antenna element 410a from the start of a given frame.

After this, the synchronisation circuit 400 receives a second signal from second antenna element 410b. The synchronisation circuit 400 can continue to switch again during a guard interval to further antenna elements (e.g. 410c, or back to 410a, etc) or even more antenna elements, or can use just two antenna elements (like 410a and 410b only)

By repeatedly switching between antenna elements 410a-c of the array 410, the data contained in the transmitted OFDM signalling can keep being received, but the additional knowledge of phase and amplitude differences between reception at each of the antenna elements 410a/b/c can be gathered and used to determine a relative orientation of the multi-antenna receiver from a transmitter of the RF signals. In effect, reading the OFDM signalling from different antenna elements (410a-c) allows for use of characteristics (e.g. phase and/or amplitude of the respective signals from each antenna element 410a-c) determined for the first and second (or more) radio-frequency signals received via respective antenna elements following the synchronisations on each of the elements. The direction of orientation component 427 can utilise these characteristics to determine the relative orientation of the array 410 to the transmission source.

Also, because the switch is being performed from the determined position of the at least one repeated guard interval, or a position of a repeated guard interval, in the first radio-frequency signal, this means that the switching occurs during reception of non-critical data. Switching at such times helps to reduce the likelihood of critical data loss.

The apparatus 100 implemented as part of a synchronisation circuit 400 therefore allows for signalling to be received via a first antenna element 410a of the array 410, then, at a time where critical data is not going to be lost (during the guard interval) the apparatus 100 causes switching to receiving signalling via a second antenna element 410b of the array.

This means that the apparatus 100 has switched the antenna array 410 to receiving a second signal from another antenna element (410b or even 410c) during a non-critical time.

In particular, because the synchronisation circuit 400 is causing switching between antenna elements 410a-c of the array 410 at times when critical data will not be lost, only a single decoder/demodulator chain 420 needs to be coupled to the antenna array 400. Every time the antenna array 410 is switched to pass on the received signal from a different antenna element 410a/b/c, the received signal is provided onward to the decoder/demodulator chain 420 which can operate on that received signal to extract data of interest.

In summary, by performing synchronisation with a signal received via a first antenna element of an array, and switching (based on that synchronisation) to a second antenna element at a guard interval, it is possible to ensure safe and accurate switching between signals from different antenna elements to thereby maintain integrity of critical data transmissions and also determine relative orientation of the array from the transmission source. All these advantages can also be achieved while simultaneously reducing receiver complexity as only a single decoder/demodulator chain (as per 420) need be provided to successfully decode/demodulate the data from the cumulated signals from each antenna element (as per 410a-c).

Figure 7:
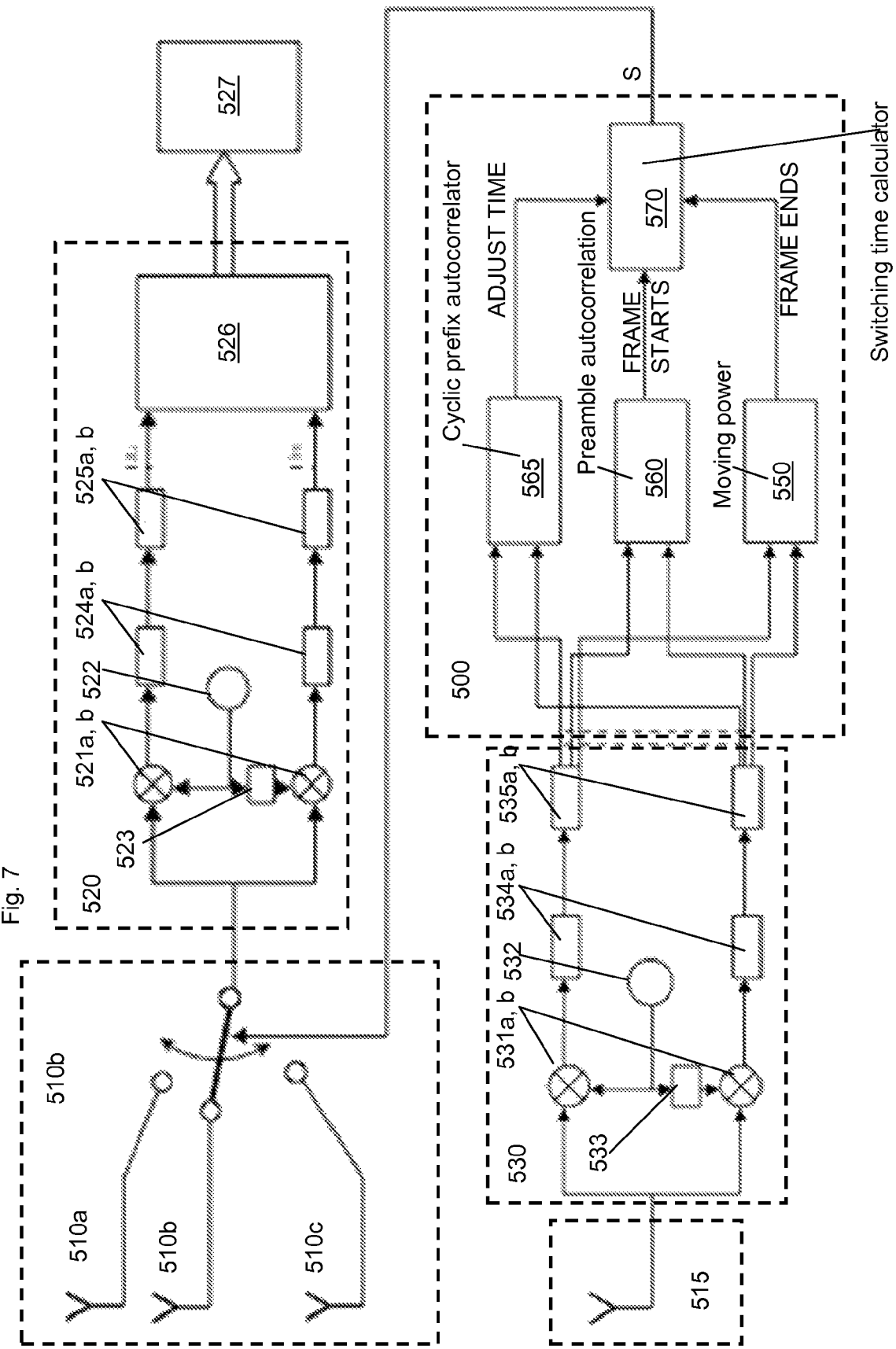
FIG. 7 illustrates a second example utilising two demodulation/decoding paths.

FIG. 7 illustrates a schematic of a further example. This example is similar to that of FIG. 6 except that it also comprises another demodulator/decoder chain 530 which is connected (non-switchably) to a first reference antenna element 515. In contrast to the example of FIG. 6, the synchronisation circuit 500 (performed in this example by a plurality of separate circuits—discussed below) continually receives an RF signal from a given transmitter via the first reference antenna element 515. This first 'reference' demodulator/decoder chain 530 provides a reference signal for maintaining a synchronisation fix on the signal of interest.

The second receiver demodulation/decoder chain 520 and antenna array 510 effectively operates in the same way as that of FIG. 6, i.e. switched by the synchronisation circuit 500. Because the first reference chain 530 is continually being synchronised with the OFDM signal being received by the first reference antenna element 515, this helps to ensure that no critical data is lost from the received transmission, whilst simultaneously providing a reference for switching in the second receiver chain, i.e. reliably indicating when guard intervals should be occurring in the received signalling, and when the synchronisation circuit 500 should cause antenna elements 510a-c to be switched between. This can provide for enhanced calculation of optimal switching time and data integrity.

This particular synchronisation circuit 500 calculates the optimal switching time by comparing portions of the raw IQ signal against itself. A given guard interval GI3 occurs at a first time, and from the standard and the training symbols it can be determined that the next guard interval GI4 should occur 3.2 µs after GI3. Based on this principle, two portions of the signal can be compared against each other to try and perform pattern matching of those portions. While the pattern of each guard interval will be reflective of the OFDM block that particular guard interval GI abuts, there will be common features between respective guard intervals given that they are the same length as each other, and always reflect the same portion (the last 0.8 microseconds) of their corresponding OFDM blocks. As such, various parts of a guard interval such as leading edge, trailing edge (e.g. frame start, frame end, etc), and other such patterns will be similar and recognisable between respective guard intervals.

Therefore, the similarity between the pattern of two signal segments having the same length as the standard-defined guard interval (e.g. 0.8 microseconds) can be computed and used to work out the likelihood of those two portions being two sequential guard intervals as there should be a strong autocorrelation between two portions that are indeed guard intervals.

In operation, the moving power calculator 550 of the synchronisation circuit 500 receives the real (Q) and imaginary (I) parts of a signal received from a first reference antenna element 515. It should be pointed out that in other applications for direction finding it has been found that using I and Q parts of a signal provides a particularly advantageous way of determining direction. The moving power calculator 550 then calculates the power and pattern of two respective portions of the received signal, which can be used to provide an indication of where the end of a frame is located. This information is provided to the switching time calculator 570.

The real and imaginary parts of the signal are also useable with preamble autocorrelation circuit 560 which will compare the respective patterns to calculate the extent of the correlation between the two portions. This can be used to provide an indication where the start of a frame is located. This information is then provided to the switching time calculator 570.

The moving power calculator 550 is continuously monitoring two portions of the incoming signal spaced apart by a particular symbol length and/or time and therefore constantly monitoring pattern matches. The preamble autocorrelation circuit 560 also receives the real and imaginary parts of the signal currently being received to perform its calculations.

The switching time calculator (which can be a processor-less finite-state machine) 570 receives the output from the moving power calculator 650 and the preamble autocorrelation circuit 560 in order to establish whether the conditions are met to elicit switching at a particular time.

The maximum correlation value or values that occur for a given frame are likely to indicate the times at which guard intervals have occurred and therefore also indicate the optimal switching time. If the threshold values are matched then the switching time calculator/finite-state machine 570 will provide a switching signal S to cause switching to the next antenna element, which in turn will restart calculations in advance of the next switch to occur.

In addition, the cyclic prefix calculator 565 is configured to operate as described above to 'search' for the respective guard intervals in a signal. Once guard intervals have been identified this can provide information that is useable to adjust the calculated switching time based on where the frame is identified to start and where it is identified to end. In any case, these circuits (550, 560, 565) can each co-operate together to allow for synchronisation of the switching of the antenna array with the frame and OFDM blocks within that frame being received from a transmitter.

In another example, the moving power calculator 550/650 can calculate the moving average of the magnitude squared difference signal for a time period that is equivalent to the length of a standard guard interval (e.g. over a 0.8 microsecond period) to use as the basis for the autocorrelation.

When the synchronisation circuit 500 detects the end of the transmission, i.e. the end of the frame, the apparatus returns to an idle state (and optionally goes back to the first antenna element 510a).

To summarise the operation of the synchronisation circuit 500 described above, these synchronisation circuits 500 are configured to move between three different states to provide this functionality:

1) Idle state—The synchronisation circuit 500 stays in, or returns, to the idle state when no signal is being received.
2) Acquisition state—The synchronisation circuit 500 moves to the acquisition state if a new frame is received, and starts to acquire a raw estimate of signal being received (e.g. raw IQ data of the signalling, such as from the first reference antenna element 515). Afterwards, the synchronisation circuit 500 moves to the tracking state.
3) Tracking state—in the tracking state the synchronisation circuit 500 measures the time difference between the current switching time and what the synchronisation circuit 500 calculates to be the optimal switching time and corrects the current switching time accordingly, e.g. using autocorrelation, and/or monitoring for any corruption of data. For example, if the last switching between two antennas is detected to have caused a loss of data the synchronisation circuit 500 can modify the switching time to correct for this to try and ensure that the next switch does not cause loss of data.

Figure 8A:
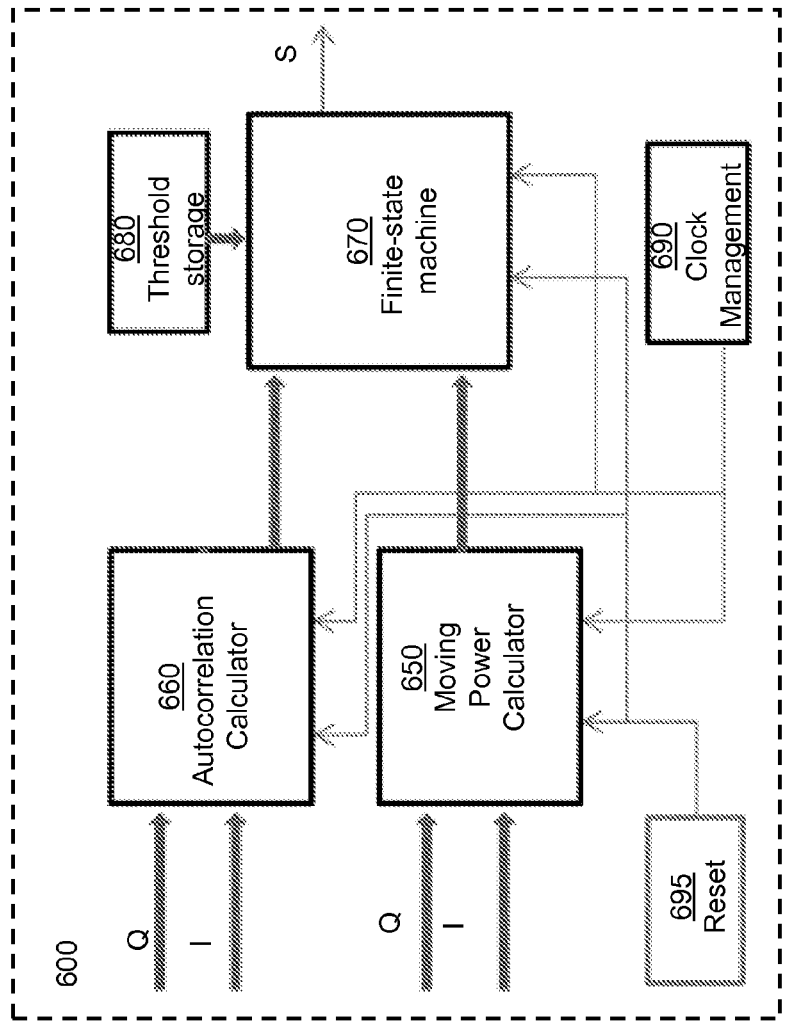
FIG. 8*a* illustrates an example of a synchronisation circuit.

FIG. 8a shows another embodiment of a switching/synchronisation circuit 600 that is similar to that of synchronisation circuit 500 shown in FIG. 7. Circuit 600 also comprises a threshold storage circuit 680 which stores information about when switching is to occur, i.e. in response to a particular threshold being met by the autocorrelation between the two respective portions of the signal. These thresholds can be user-determined, predetermined by the present system or another system, or (by way of a learning algorithm) altered in response to particular situations to tailor the switching response.

In contrast to FIG. 7, which has the autocorrelation circuit 560 (which detects the short training symbols STS) and the cyclic prefix autocorrelation circuit 565 (which detects the respective guard intervals GI) are combined into one autocorrelation circuit 660. Furthermore, respective circuits 650, 660, 670 can be reset by an external signal to restart the process for taking new sets of readings, and all the respective circuits 650, 660, 670 are in communication with/being driven by a common clock signal (see clock management 690). Furthermore, in this preferred implementation the threshold storage 680 can be reprogrammed at runtime. Functionally, the example of FIG. 8a operates in substantially the same way as the arrangement shown in FIG. 7.

An advantage of any of these examples is that the right time of the symbol starts can be found also in the event where a frame start has been detected inaccurately. If there is a slip in the symbols such that data is lost from one chain, a correction can be made to find the right timing on when to switch the receiver antenna array while not losing data because the reference antenna has still been receiving the data.

Another advantage that this switching system provides is that switching can occur up to 800 ns earlier or later than the exact start of the guard interval GI, and data integrity can still be maintained. For example, If the switching occurs within the 800 ns after the start of the guard interval GI, then switching still occurs within the non-critical data of the guard interval and no critical data is lost (as described above). If the switching occurs in the 800 ns before a given guard interval (e.g. in the last 800 ns of the preceding payload data, such as PL1) the data that would otherwise be lost from that region can be substituted by the received guard interval GI3 corresponding to that of the payload data PL1.

Figure 8B:
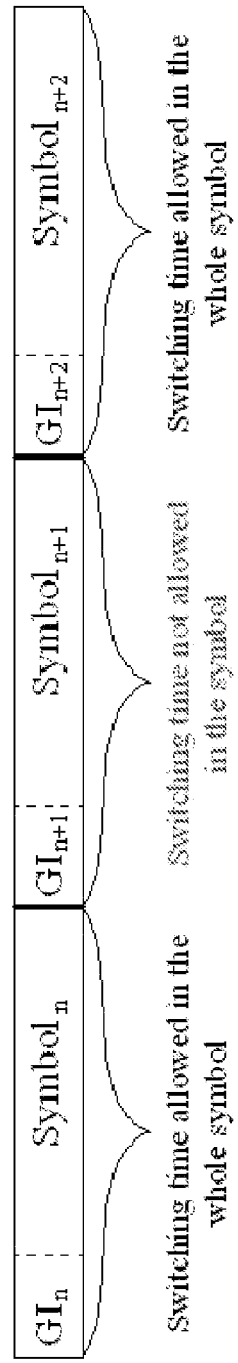
FIG. 8*b* shows an example of switching times.

In an optional embodiment, shown in FIG. 8b, antenna switching can occur at an arbitrary but known time in an OFDM block (a block contains the GI and the OFDM symbol). In this embodiment the next switching should occur after at least one complete undisturbed OFDM block has been received, though in some embodiments this may not be possible at certain instances due to certain system constraints. In this way it is guaranteed that at least one undisturbed OFDM-symbol is acquired within a switching interval.

In the example of FIG. 7, the reference antenna element 515 is non-switchably connected to the reference demodulator/decoder chain. In a variation of this embodiment of FIG. 7 (whether using synchronisation circuit 500 or 600) the reference demodulator/decoder chain is actually switchably connected to a multi-antenna array (which can be the same (or different) to that of multi-antenna array 510 of FIG. 7). Instead of the reference demodulator/decoder chain only receiving signals from a static reference antenna element (515), this chain can also be switched to incrementally change the reference antenna element from which signals are being received by the reference demodulator/decoder chain.

This can be advantageous in examples where a multi-antenna array is shaped in such a way that errors could occur due to an increasing distance or phasing issues between a static reference antenna element and whichever antenna element of an array is being used as switching progresses through the respective elements of that array. For example, for an array shaped in a circle/with radial symmetry it can be advantageous to incrementally switch both the reference antenna element and the receiver antenna element so as to cause the reference antenna element to 'follow' the receiver antenna element presently being used around that array, though this is just one example. Other array types may benefit from different switching arrangements. In any case, both the reference demodulator/decoder chain and the receiver demodulator/decoder chain can be made to be flexible to allow for optimisation for use with a given array.

It should also be noted that each of synchronisation circuits 500/600 can be implemented as a finite-state machine, or as a sequencer configured to be used with or without one or more processors.

Figure 9:
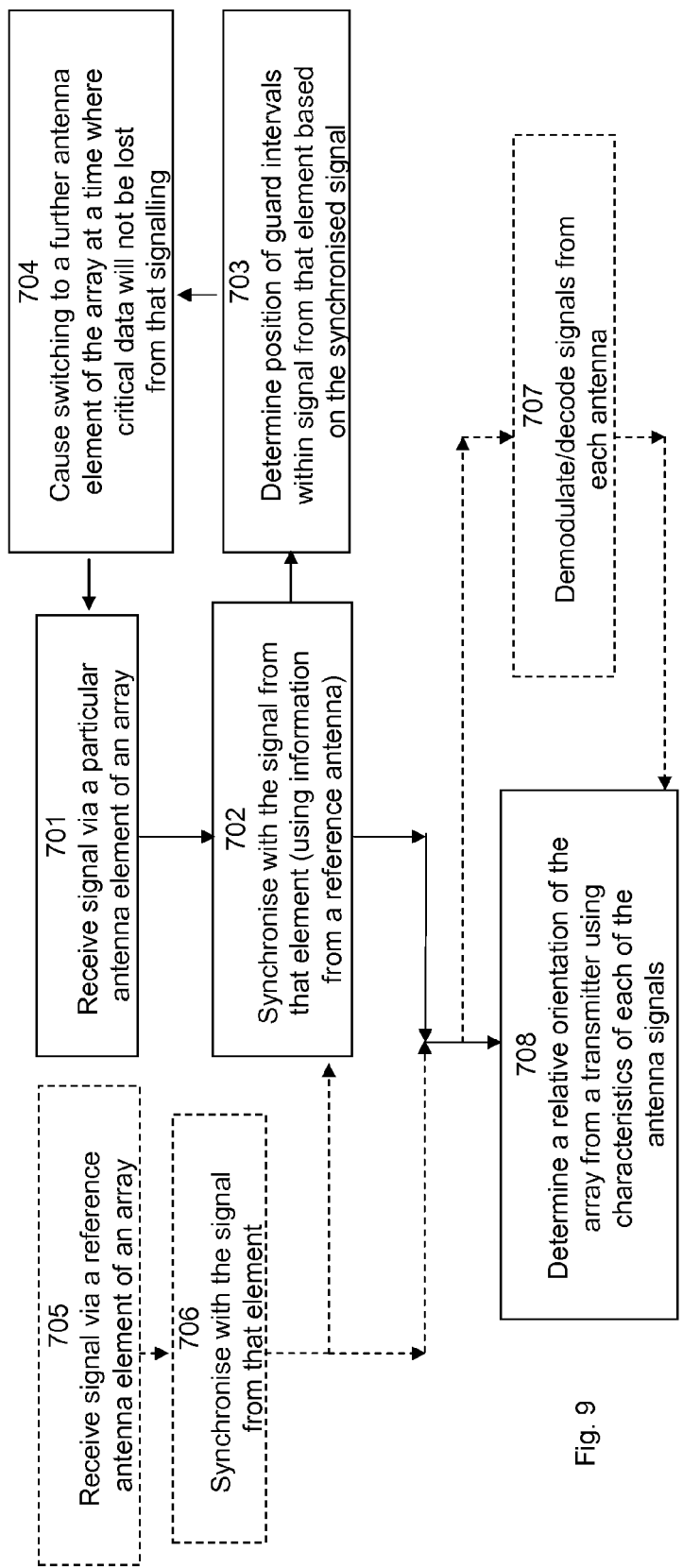
FIG. 9 illustrates a flowchart according to a method of the present disclosure.

FIG. 9 illustrates a flowchart summarising the methods of operation described above.

701—Receive signal via a particular antenna element of an array—this will start receiving signalling from a first antenna element.

702—Synchronise with the signal from that element—This might optionally involve using information from a reference antenna.

703—Determine position of guard intervals within signal from that element based on the synchronised signal.

704—Cause switching to a further antenna element of the array at a time where critical data will not be lost from that signalling—this is based on the position of the guard intervals within the signalling as discussed above. This will result in switching to another antenna element, from where step 701 is repeated for that new antenna element.

705—Receive signal via a reference antenna element of an array—this is an optional step for when two demodulator/decoder chains are used as discussed above.

706—Synchronise with the signal from that (reference antenna) element—This is used to help aid the synchronisation step 702 and also used to feed the step of demodulation/decoding the data of interest.

707—Demodulate/decode signals from each antenna element—for the purposes of determining a relative orientation of the array from a transmission source, this is an optional step.

708—Determine a relative orientation of the array from a transmitter using characteristics of each of the antenna signals—the characteristic differences between signals from respective antenna elements allow for orientation between the receiver array and a particular transmitter to be determined.

Figure 10:
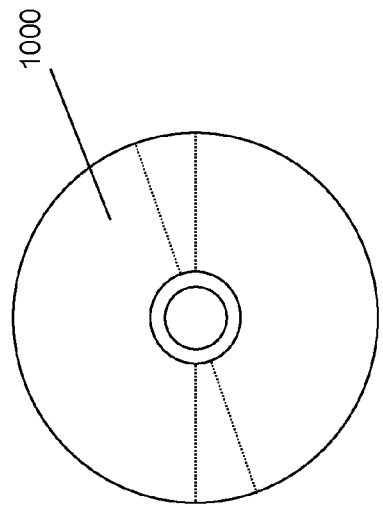
FIG. 10 illustrates schematically a computer readable media providing a program according to an embodiment of the present disclosure.

FIG. 10 illustrates schematically a computer/processor readable media 1000 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function. The computer program code may be distributed between the multiple memories of the same type, or multiple memories of a different type, such as ROM, RAM, Flash, hard disk, solid state, etc.

Figure 12:
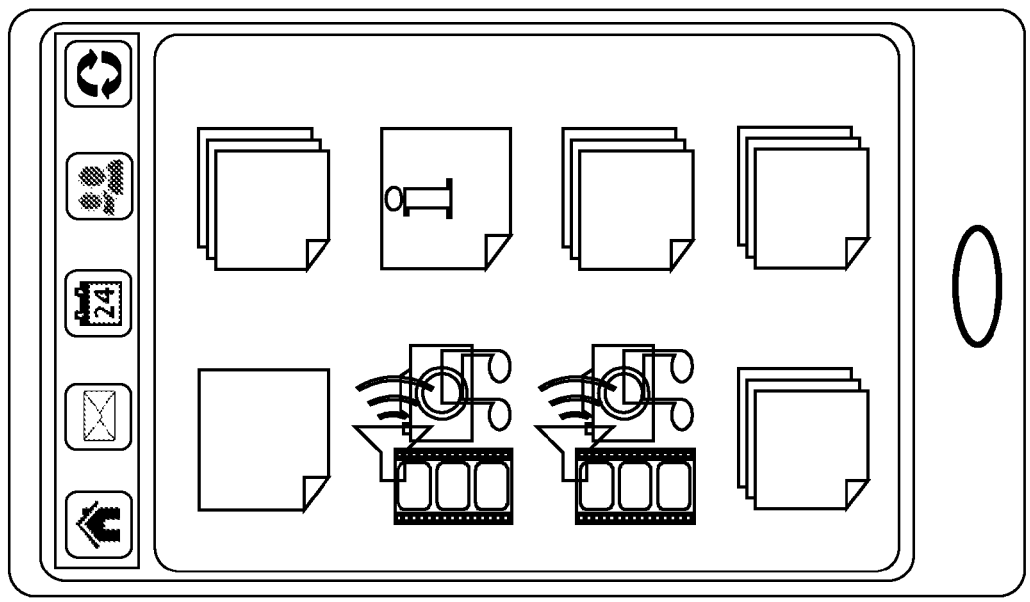
FIGS. 11 and 12 illustrate various embodiments as implemented in example electronic devices.
Figure 11:
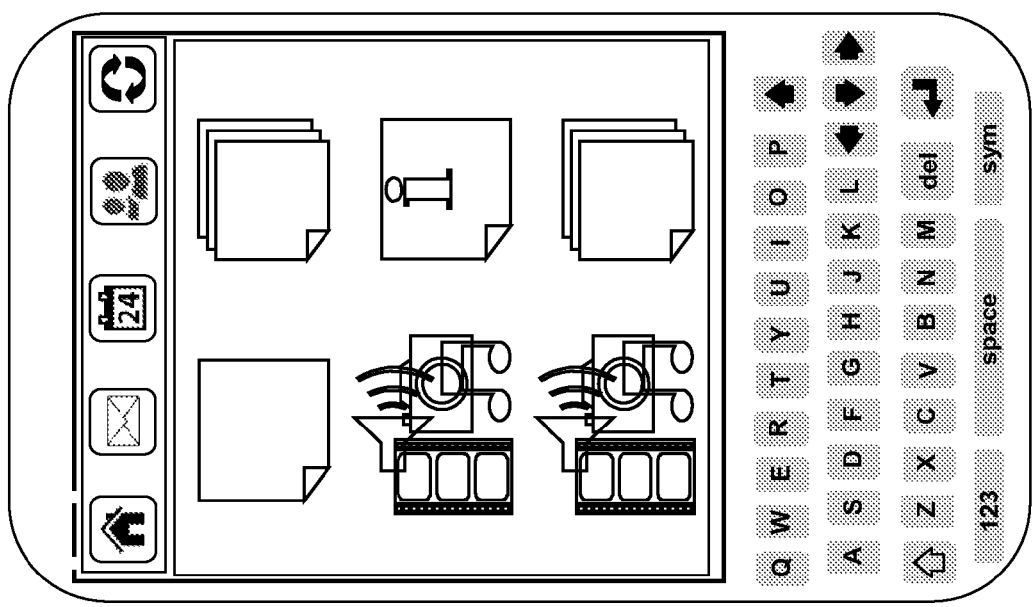

It will be appreciated that any of the above embodiments would be useable in various different devices, particularly mobile devices with wireless communications capability like mobile telephones like that of FIG. 11, and touch screen devices like that shown in FIG. 12. For example, in other example embodiments, the apparatus 100 or any of the examples given above can be provided in such a device 200. Apparatus 100 may be provided as a module (shown by the optional dashed line box in FIG. 2 and FIG. 3) for a mobile phone or PDA or audio/video player or the like. Such a module, apparatus or device may just comprise a suitably configured memory and processor (as per FIG. 1—see also the apparatus 100 within device 300 of FIG. 3).

In the example of FIG. 2, the functionality offered by each of the components in the example of FIG. 1 is shared between other components and the functions of the device of FIG. 2. In some examples the device 200 is actually part of a mobile communications device like a mobile telephone of FIG. 11, PDA of FIG. 12, tablet PC, or laptop, or the like.

In this case, the device 200 comprises a display device 240 such as, for example, a Liquid Crystal Display (LCD) or touch-screen user interface. The device 200 is configured such that it may receive, include, and/or otherwise access data. For example, device 200 can comprise a communications unit 250, such as a receiver, transmitter, and/or transceiver, in communication with a multi-antenna array 260 for connecting to a wireless network and/or a port (not shown) for accepting a physical connection to a network, such that data may be received via one or more types of networks. This example embodiment comprises a memory 220 that stores data, possibly after being received via multi-antenna 260 or port or after being generated at the user interface 230. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

The device 200 comprises processor 210, memory 220, interface 230, display 240 (in certain embodiments, the interface 230 and the display 240 may be combined, for example, via a touch sensitive display), communications unit 250, multi-antenna 260 all connected together via communications bus 280. The communications unit 250 can be, for example, a receiver, transmitter, and/or transceiver, that is in communication with a multi-antenna 260 for connecting to a wireless network and/or a port (not shown) for accepting a physical connection to a network, such that data may be received via one or more types of networks. The communications (or data) bus 280 can be seen, in one or more embodiments, to provide an active coupling between the processor 210 and the memory (or storage medium) 220 to allow the processor 210 to access the computer program code stored on the memory 220.

The memory 220 comprises the computer program code in the same way as the memory 120 of apparatus 100, but may also comprise other data that can be useable by the (or other) processor/processors/memory/memories. For example, the memory 220 can (in some embodiments) be able to store other data, possibly after being received via antenna 260 or port or after being generated at the user interface 230. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

As has been discussed, FIG. 2 illustrates schematically a device 200 (such as a portable mobile telephone or portable electronic device) comprising the apparatus 100 (or functionality of the apparatus 100 distributed throughout its components) as described above. FIG. 3 illustrates another such implementation in device 300.

The device 300 may be an electronic device (including a tablet personal computer), a portable electronic device, a portable telecommunications device, or a module for any of the aforementioned devices. The apparatus 100 can be provided as a module for such a device 300, or even as a processor/memory for the device 300 or a processor/memory for a module for such a device 300. The device 300 also comprises a processor 385 and a storage medium 390, which are electrically connected to one another by a data bus 380. This data bus 380 can be seen to provide an active coupling between the processor 385 and the storage medium 390 to allow the processor 380 to access the computer program code.

The apparatus 100 is first electrically connected to an input/output interface 370 that receives the output from the apparatus 100 and transmits this onwards to the rest of the device 300 via data bus 380. Interface 370 can be connected via the data bus 380 to a display 375 (touch-sensitive or otherwise) that provides information from the apparatus 100 to a user. Display 375 can be part of the device 300 or can be separate.

The device 300 also comprises a processor 385 that is configured for general control of the apparatus 100 as well as the rest of the device 300 by providing signalling to, and receiving signalling from, the other device components to manage their operation (e.g. to receive signals from and allow switching of a multi-antenna array).

The storage medium 390 is configured to store computer code configured to perform, control or enable the making and/or operation of the apparatus 100. The storage medium 390 may also be configured to store settings for the other device components. The processor 385 may access the storage medium 390 to retrieve the component settings in order to manage the operation of the other device components. The storage medium 390 may be a temporary storage medium such as a volatile random access memory. On the other hand, the storage medium 390 may be a permanent storage medium such as a hard disk drive, a flash memory, or a non-volatile random access memory. The storage medium 390 could be composed of different combinations of same or different memory types.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA) or similar (such as CPLD—Complex Programmable Logic Device; PSoC—Programmable System on Chip; ASIC—Application Specific Integrated Circuit, etc), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/ embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and at least one memory including computer program code, the at least one memory and the computer program configured to, with the at least one processor, cause the apparatus to perform at least the following:
   perform at least partial synchronisation on a first radio-frequency signal from a first antenna element, of an array of spatially distributed antenna elements in a multi-antenna array receiver, to determine the position of at least one of a repeated guard interval in the first radio-frequency signal from the first antenna element, the repeat occurring at a particular defined characteristic interval;
   use the determined position of the at least one guard interval in the first radio-frequency signal to switch to a second radio-frequency signal from a second antenna element, of the array of spatially distributed antenna elements in a multi-antenna receiver, the switch being performed from the determined position of the at least one repeated guard interval, or a position of a repeated guard interval, in the first radio-frequency signal to perform at least partial synchronisation to the second radio-frequency signal; and
   determine a relative orientation of the multi-antenna receiver from a transmitter of the radio-frequency signals using characteristics determined for the first and second radio-frequency signals following the at least respective partial synchronisations.

2. The apparatus of claim 1, wherein the apparatus is configured to perform at least partial synchronisation on the second radio-frequency signal after the switch.

3. The apparatus of claim 1, wherein the apparatus is configured to identify training symbols in the respective radio-frequency signals received from the respective antenna elements to perform said synchronisation.

4. The apparatus of claim 1, wherein the apparatus is configured to identify training symbols in the first radio-frequency signal to perform said synchronisation.

5. The apparatus of claim 1, wherein the apparatus is configured to identify training symbols in the second radio-frequency signal to perform said synchronisation.

6. The apparatus of claim 1, wherein the apparatus is configured to perform determination of the relative orientation characteristics of the first and second radio-frequency signals after the respective at least partial synchronisations.

7. The apparatus of claim 1, wherein the repeated guard intervals have a particular length, and wherein the switching is performed to coincide with the beginning, middle or end of the particular length.

8. The apparatus of claim 1, wherein the radio-frequency signal comprises a modulated carrier wave, modulated to represent data.

9. The apparatus of claim 1, wherein the first and second radio-frequency signals represent repeated instances the same data.

10. The apparatus of claim 1, wherein the first and second radio-frequency signals represent a whole frame, the frame comprising a sequence of training symbols and payload data demarked with respective repeated guard intervals.

11. The apparatus of claim 1, wherein the frame represents a packetized burst in at least one of an OFDM or WLAN system.

12. The apparatus of claim 1, wherein the apparatus is configured to use at least one common demodulation and decoding channel path in demodulating and decoding the respective first and second radio-frequency signals.

13. The apparatus of claim 12, wherein the apparatus is configured to switch the radio-frequency signals from the respective antenna elements to use the at least one common demodulation and decoding channel path to demodulate and decode the respective radio-frequency signals, the switch being performed from the determined position of the at least one repeated guard interval, or a position of a repeated guard interval, in an radio-frequency signal from a previous antenna element.

14. The apparatus of claim 12, wherein the apparatus is configured to use the at least one common demodulation and decoding channel path in demodulating and decoding the respective first and second radio-frequency signals and wherein the apparatus is configured to determine the relative orientation characteristics using the at least one common demodulation and decoding channel path.

15. The apparatus of claim 1, wherein the apparatus is configured to use:
   a first reference demodulation and decoding channel path connected to a first reference antenna element; and
   a second receiver demodulation and decoding channel path connected to a second receiver antenna element,
   wherein the first reference channel path is useable to synchronise switching of the second receiver demodulation and decoding channel path from the second receiver antenna element to a further receiver antenna element.

16. The apparatus of claim 15, wherein the first reference antenna element is the same reference antenna element for all receiver elements to which the second receiver channel path is switched.

17. The apparatus of claim 15, wherein the apparatus is configured to switch the first reference antenna element so that the reference antenna element for a given receiver element varies in accordance with the particular receiver antenna element currently in use.

18. The apparatus of claim 1, wherein the apparatus is configured to switch to radio-frequency signals from further antenna elements from the spatially distributed antenna elements of the multi-antenna array receiver, the switch being performed from the determined position of the at least one repeated guard interval, or a position of a repeated guard interval, in the first radio-frequency signal, or the radio-frequency signal from the previous antenna element, to perform at least partial synchronisation to the further radio-frequency signal; and determine a relative orientation of the multi-antenna receiver from the transmitter using characteristics determined for a plurality of the first, second and further radio-frequency signals following the at least partial synchronisation.

19. A method comprising:

performing at least partial synchronisation on a first radio-frequency signal from a first antenna element, of an array of spatially distributed antenna elements in a multi-antenna array receiver, to determine the position of at least one of a repeated guard interval in the first radio-frequency signal from the first antenna element, the repeat occurring at a particular defined characteristic interval;

using the determined position of the at least one guard interval in the first radio-frequency signal to switch to a second radio-frequency signal from a second antenna element, of the array of spatially distributed antenna elements in a multi-antenna receiver, the switch being performed from the determined position of the at least one repeated guard interval, or a position of a repeated guard interval, in the first radio-frequency signal to perform at least partial synchronisation to the second radio-frequency signal; and determining a relative orientation of the multi-antenna receiver from a transmitter of the RF signals using characteristics determined for the first and second radio-frequency signals following the at least respective partial synchronisations.

20. A non-transitory computer readable medium comprising computer program code stored thereon, the computer readable medium and computer program code being configured to, when said computer program code is run on at least one processor, cause an apparatus to perform at least the following:

performing at least partial synchronisation on a first radio-frequency signal from a first antenna element, of an array of spatially distributed antenna elements in a multi-antenna array receiver, to determine the position of at least one of a repeated guard interval in the first radio-frequency signal from the first antenna element, the repeat occurring at a particular defined characteristic interval;

using the determined position of the at least one guard interval in the first radio-frequency signal to switch to a second radio-frequency signal from a second antenna element, of the array of spatially distributed antenna elements in a multi-antenna receiver, the switch being performed from the determined position of the at least one repeated guard interval, or a position of a repeated guard interval, in the first radio-frequency signal to perform at least partial synchronisation to the second radio-frequency signal; and determining a relative orientation of the multi-antenna receiver from a transmitter of the RF signals using characteristics determined for the first and second radio-frequency signals following the at least respective partial synchronisations.

* * * * *